Patented Oct. 27, 1931

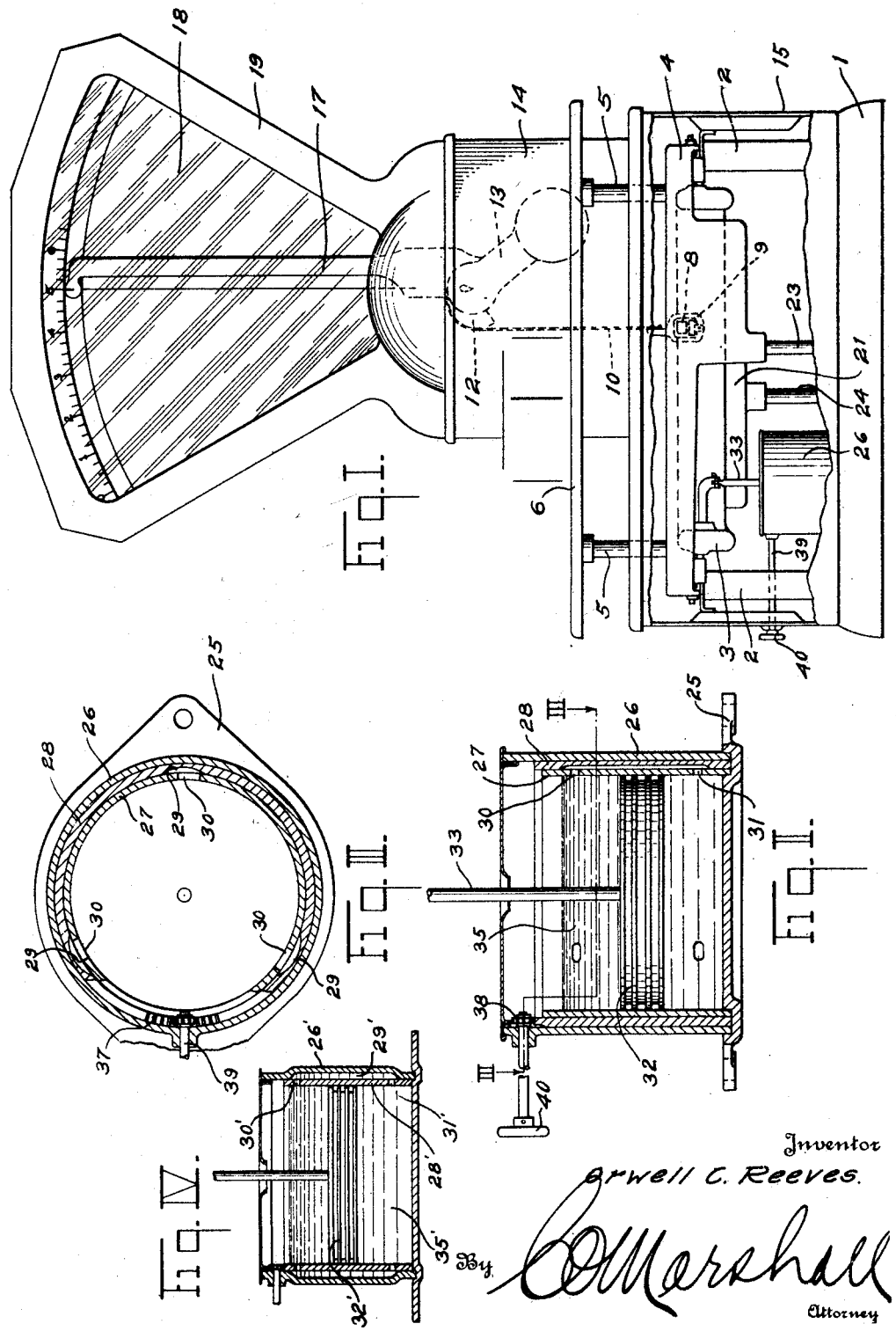

1,829,540

UNITED STATES PATENT OFFICE

ORWELL C. REEVES, OF TOLEDO, OHIO, ASSIGNOR TO TOLEDO SCALE MANUFACTURING COMPANY, OF TOLEDO, OHIO, A CORPORATION OF NEW JERSEY

DASHPOT FOR WEIGHING SCALES

Application filed June 30, 1927. Serial No. 202,519.

This invention relates to weighing scales, and more particularly to vibration dampening devices or dash pots for use therein, and one of the principal objects of the invention is the provision of novel adjusting means for the dash pot which is rendered accessible from the exterior of the scale housing.

Another object of the invention is the provision of means for regulating the rate of flow of the damping fluid from one side of the plunger to the other in order to vary the vibration retarding effect as desired.

Another object is the provision of a dash pot for scales equipped with a simple and positive adjustment which is not affected by the movement of the plunger.

Still a further object is the provision of a dash pot which is simple and inexpensive in construction, the parts being of sturdy construction and not liable to get out of order through extensive use.

Other objects and advantages will be apparent from the following description, in which reference is had to the accompanying drawings illustrating preferred embodiments of my invention and wherein similar reference numerals designate similar parts throughout the several views.

In the drawings:

Figure I is a front elevational view of a scale embodying my invention, parts being broken away;

Figure II is an enlarged vertical sectional view through the dash pot of my invention;

Figure III is a sectional top plan view of the dash pot taken substantially on the line III—III of Figure II;

Figure IV is a vertical sectional view through a dash pot showing a modified form of my invention.

Referring to the drawings in detail, I have shown the dash pot of my invention as incorporated in a weighing scale of the so-called fan type. However, it is to be understood that I contemplate its use in any device where it may be found applicable, and, as the scale per se forms no part of the present invention, I will only describe it in such detail as to show the connection of my invention therewith.

The scale consists of a base plate 1 forming a support for the standards 2, at the upper ends of which is fulcrumed a lever 3 adapted to oscillate in a plane substantially at right angles to the plane of movement of the load-offsetting and indicating mechanism (hereinafter described). The forward end of the lever 3 is provided with pivots carrying a spider 4, the latter being equipped with a pair of upwardly projecting rods 5 supporting at their upper extremities a commodity-receiver or platform 6. The rear portion of the lever 3 is formed with a projection 8 having a cone pivot engaging a stirrup 9 secured to the lower end of a flexible metallic band or ribbon 10. The upper portion of the ribbon is connected to and overlies the curved surface of a sector or cam 12 secured to a load-offsetting pendulum 13, the latter being pivotally supported within the upright housing 14, the latter being carried upon the rectangular box-like casing 15 supported by the base plate 1 and enclosing the lever mechanism of the scale.

The pendulum 13 is provided with an upwardly projecting indicator 17 which is adapted when the pendulum is actuated by a load upon the platform 6 to swing over a suitably graduated chart 18 carried in the fan-shaped casing 19 mounted upon the housing 14.

The rear end of the lever 3 carries a weighted spider 21 for the purpose of elevating the pendulum to a zero position, the spider 21 together with the platform spider 4 being retained in substantially vertical position throughout weighing movements by means of check links (not shown) secured to the lower extremities of the depending rods 23 and 24.

In the operation of the scale the weight of a load placed upon the commodity-receiver 6 is transmitted through the lever 3 to the pendulum 13, causing the latter to oscillate in a clockwise direction and the indicator to swing over the chart to indicate the weight of the load.

In order to prevent undue oscillation of the weighing mechanism I have provided a novel dash pot which consists of a base or bottom plate 25 formed with an annular groove which fixedly receives an external sleeve 26 and an internal sleeve 27 arranged concentric with the sleeve 26. Revolubly positioned between the internal and external sleeves is a sleeve 28 having vertical longitudinal grooves or by-passes 29 adapted for registration with pairs of upper and lower ports 30 and 31 arranged on either side of a piston or plunger 32. The plunger is connected by means of a rod 33 to a movable element of the weighing mechanism, in the particular embodiment shown this element being the main lever 3. A suitable damping fluid 35 is contained in the dash pot and provides a medium for resisting movement of the plunger. The ports 30 and 31 when in registration with the by-passes 29 provide a suitable channel for the fluid to flow around the plunger and thus decrease the resistance acting to retard movement of the plunger. In order to adjust the sleeve 28 a portion of the upper edge of the sleeve is formed with teeth 37 in mesh with a toothed pinion 38 fixed to one end of a horizontally positioned shaft 39, suitably journaled in a boss extending outwardly from the external sleeve 26. The shaft 39 is equipped with an operating knob 40 which may be located exteriorly of the weighing scale housing, as shown in Figure I. It is obvious that by rotating the knob 40 the toothed pinion meshing with the teeth 37 on the sleeve will cause the latter to be rotated, this movement bringing the by-passes 29 either into or out of registration with the ports 30 and 31 in the internal sleeve 27, thus providing a simple means for adjusting the rate of flow of the damping fluid from one side of the plunger to the other. The dash pot is provided with a suitable cover 41 to prevent the ingress of dust and other foreign matter.

In the modified form of my device illustrated in Figure IV the dash pot consists of a sheet metal container 26' equipped with a movable sleeve 28' which is adapted to be rotated by pinion mechanism in the manner hereinbefore described. The exterior casing 26' is formed with by-pass channels 29' which are adapted to register with ports 30' and 31' in the movable sleeve 28' to permit the damping fluid 35' to pass from one side of a piston 32' to the other. In this construction the walls of the piston 32' are in juxtaposition to the interior walls of the movable sleeve 28', and rotation of the sleeve 28' operates to move the ports 30' and 31' into or out of registration with the by-passes 29' in the dash pot casing in order to vary the damping effect of the fluid upon the piston 35'.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in combination, a dash pot comprising a receptacle adapted to contain a damping fluid a fixed tubular member within said receptacle, a piston in said receptacle within said tubular member, a cylindrical member in said receptacle provided with a groove, and means for rotarily adjusting said cylindrical member to regulate the damping effect of said fluid on said piston.

2. In a device of the class described, in combination, a dash pot comprising a receptacle adapted to contain a damping fluid a fixed tubular member within said receptacle, a piston in said receptacle within said tubular member, a relatively movable cylindrical member fitting between said tubular member and said receptacle, said cylindrical member having a by-pass, and means for rotarily adjusting said cylindrical member to regulate the damping effect of said fluid on said piston.

3. In a device of the class described, in combination, a dash pot comprising a cylindrical exterior wall, a sleeve within said wall, said sleeve having a by-pass therein, and a tubular member within said sleeve, said tubular member having openings adapted to communicate with the by-pass in said sleeve, and means for imparting relative rotation to said sleeve and tubular member.

4. In a device of the class described, in combination, a dashpot having concentric spaced exterior and interior walls, a sleeve fitting into the space between said walls, said sleeve having a groove, the interior of said walls having upper and lower openings, and means operative from the outside of said exterior wall for adjusting said sleeve to bring its groove into more or less complete registration with said openings.

5. In a device of the class described, in combination, a dashpot having concentric spaced exterior and interior walls, a sleeve fitting into the space between said walls, said sleeve having a groove, the interior of said walls having upper and lower openings, and means operative from the outside of said exterior wall for adjusting said sleeve to bring its groove into more or less complete registration with said openings, said means comprising rack teeth formed on the top of said sleeve and a turnable pinion meshing therewith.

6. In a device of the class described, in combination, a dashpot having concentric spaced exterior and interior walls, a sleeve fitting into the space between said walls, said sleeve having a groove, the interior of said walls having upper and lower openings, and means operative from the outside of said exterior wall for rotatably adjusting said sleeve to bring its groove into more or less complete registration with said openings.

ORWELL C. REEVES.